United States Patent [19]
Downing

[11] 3,806,236
[45] Apr. 23, 1974

[54] HIGH INTENSITY PROJECTION LAMP ASSEMBLY WITH HEAT SHIELD

[75] Inventor: Robert D. Downing, Mentor, Ohio

[73] Assignee: General Electric Company, Schenectady, N.Y.

[22] Filed: Feb. 28, 1972

[21] Appl. No.: 229,946

[52] U.S. Cl. .................... 353/97, 240/41.3, 353/98
[51] Int. Cl. ...................... C03b 21/16, C03b 21/20
[58] Field of Search ............ 353/97, 98, 99, 60, 61, 353/57; 240/46.01, 46.39, 46.41, 46.43, 41.3

[56] References Cited
UNITED STATES PATENTS

| 2,805,327 | 9/1957 | Gerstel | 240/46.41 |
| 3,253,504 | 5/1966 | Vollmer | 353/99 |
| 2,604,005 | 7/1952 | Hahn | 353/98 |
| 2,830,175 | 4/1958 | Jahnsen | 240/46.41 |
| 1,831,762 | 11/1931 | Blohm | 353/66 |
| 3,120,928 | 2/1964 | Gotze | 353/61 |
| 3,308,715 | 3/1967 | Ashcraft | 353/98 |

FOREIGN PATENTS OR APPLICATIONS

| 1,187,113 | 9/1959 | France | 353/99 |

Primary Examiner—Louis R. Prince
Assistant Examiner—A. Jason Mirabite
Attorney, Agent, or Firm—Norman C. Fulmer; Henry P. Truesdell; Frank L. Neuhauser

[57] ABSTRACT

An assembly of a high intensity projection lamp positioned within a concave reflector, and a tubular heat shield positioned partially within the open face of the reflector so as to control and reduce the light and heat projected from the reflector toward a film-mask aperture plate. The heat shield also functions to support an air nozzle for cooling the lamp. The arrangement is particularly useful in a motion picture projector.

10 Claims, 4 Drawing Figures

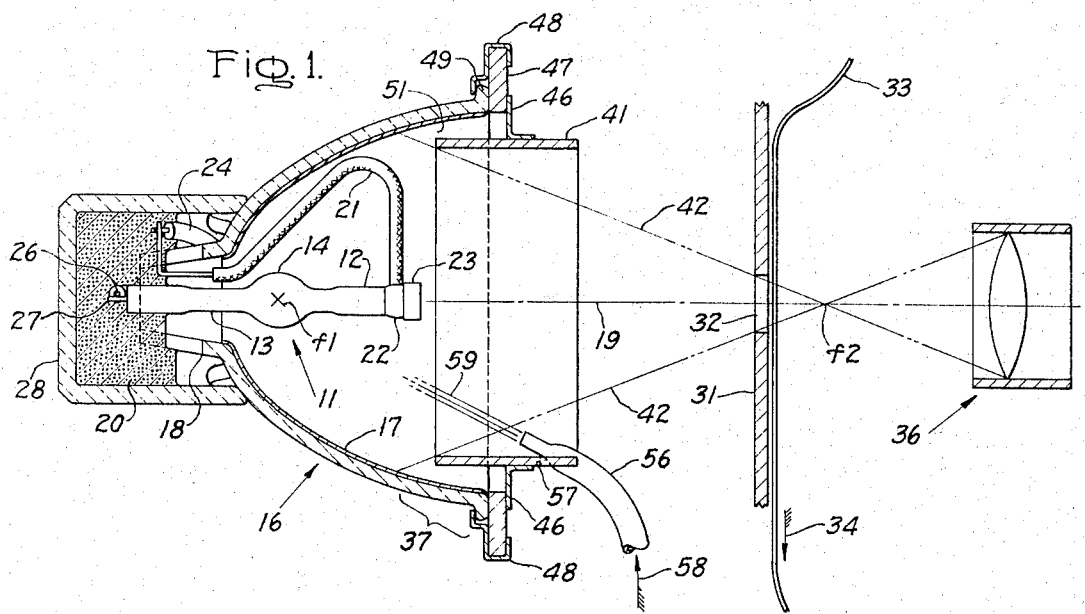
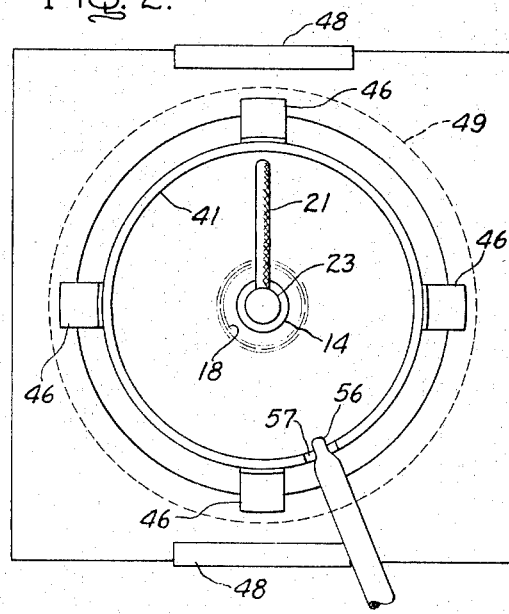 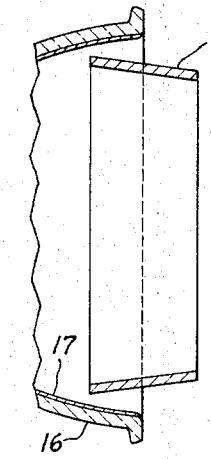 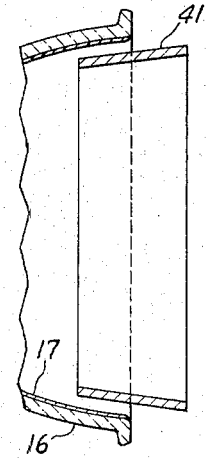

HIGH INTENSITY PROJECTION LAMP ASSEMBLY WITH HEAT SHIELD

CROSS-REFERENCE TO RELATED APPLICATION

U.S. patent application Ser. No. 138,474, filed Apr. 29, 1971, Stanley L. Slomski, "LAMP AND REFLECTOR ASSEMBLY," issued as U.S. Pat. No. 3,700,881 assigned to the same assignee as this patent application.

BACKGROUND OF THE INVENTION

The invention is in the field of high intensity reflector-lamp assemblies for film projectors.

Photographic projectors, for slides and motion picture films, have conventionally employed an optical system comprising a projector lamp, a reflector, one or more condensing lenses, an aperture mask, and a projection lens, all arranged so that the lamp, reflector, and condensing lenses direct a concentrated beam of light to the aperture mask (at which the film is located), and the projection lens then projects an image of the film onto a projection screen.

In recent years a reflector-lamp arrangement has been developed which eliminates the necessity for condensing lenses and results in a compact projector optical arrangement. Such a reflector-lamp arrangement comprises a compact high intensity lamp (which may be either arc or incandescent filament type) positioned within a relatively large concave reflector of generally ellipsoidal shape. The reflector preferably is made of glass provided on its inner surface with a multiple-layer thin-film dichroic coating which reflects visible light frontwardly of the reflector and transmits infrared (heat) radiation outwardly through the sides and rear of the reflector. Examples of such a reflector-lamp arrangement are disclosed in the above-referenced patent application, and in U.S. patents, No. 3,314,331 to Emmett Wiley and No. 3,379,868 to John Taillon, all of which are assigned to the same assignee as this patent application.

The above-described type of reflector-lamp combination is positioned, in a projector, so as to direct its high intensity convergent beam of light toward the aperture (in a masking plate) at which the film is located. In manufacturing, the glass reflector is molded as precisely as is feasible, to insure a uniform intensity, or a desired graduation of intensity, of light over the area of the aperture. However, during cooling of the molded reflector, certain uncontrollable and undesired distortions occur in the glass in the region near the outer rim of the reflector. This region of distortion might extend, for example, about one-half inch inwardly from the outer rim of a typical reflector having an outer rim diameter of about three inches. The aforesaid optical distortion of the reflector causes the outer peripheral region of the convergent beam of light to have unpredictable nonuniform intensity. Therefore, it has been customary to design and arrange the reflector and film aperture mask so that the non-uniform outer region of the convergent light beam falls on the surface of the mask surrounding the aperture and hence does not pass through the aperture. However, a considerable amount of heat inherently accompanies the light in the convergent light beam, and the light itself generates heat when it impinges on an object, and causes undesired heating of the aperture mask (usually made of metal) due to the amount of light (and accompanying heat) falling on the mask in the region around the aperture. Such heat from the mask undesirably transfers to the film and to other parts of the projector.

Various ways have been devised to prevent the abovedescribed undesired heating of the aperture mask. One way is to position an apertured heat-shield plate between the film aperture-mask and the reflector, so that the heat-shield plate intercepts the outer peripheral region of the light beam which otherwise would impinge upon the film aperture-mask. This heat-shield plate may be positioned at, and attached to, the reflector across its front outer rim. Other proposed ways of reducing the heating of the film aperture mask, are to paint a black coating over the optically distorted region of the reflector, or to remove the reflector coating, or not provide such coating, at this optically distorted region. Such methods, though effective to various degrees, are not fully satisfactory as to manufacturing expense and suitable dissipation of the unwanted light and heat.

SUMMARY OF THE INVENTION

Objects of the invention are to provide an improved high intensity reflector-lamp assembly, and to provide such an assembly for use in combination with an apertured film-masking plate, for achieving desired uniformity or gradation of light at the masking plate aperture while at the same time reducing undesired heating of the masking plate.

The invention comprises, briefly and in a preferred embodiment, an assembly of a high intensity projection lamp positioned within a concave reflector, and a tubular-shaped heat shield positioned partially within the outer open face of the reflector and circumferentially adjacent to the reflector so as to intercept and prevent light from reaching and reflecting from the optically distorted forward outer region of the reflector. This assembly is positioned with respect to an apertured film-masking plate so as to direct the projected convergent light beam from the reflector toward the aperture, with relatively little light (and accompanying heat) impinging upon the masking plate around the aperture. An air nozzle for cooling the lamp is attached to and held in place by the heat shield. The heat shield may be in the shape of a straight-sided tube, or may be tapered.

BRIEF DESCRIPTION OF THE DRAWING

FIG. 1 is a cross-sectional side view of a projector optical system in accordance with a preferred embodiment of the invention, including a projector lamp assembly, a film masking aperture plate, a film, and a projector lens;

FIG. 2 is a front view of the projector lamp assembly of FIG. 1; and

FIGS. 3 and 4 are cross-sectional side views of a portion of the projector lamp assembly, showing alternative embodiments of the invention.

DESCRIPTION OF THE PREFERRED EMBODIMENT

A compact high intensity projection lamp 11 is provided with lead-seal stems 12 and 13 extending in mutually opposite directions from a bulb portion 14 within which is generated a high intensity light when the lamp is in operation. The lamp 11 may be, for example, a high intensity arc lamp as described in the above-referenced Slomski patent application. A concave reflector 16 preferably is made of glass and has an ellipsoidal inner surface covered with a coating 17 which reflects light and transmits heat. The rear part of the reflector 16 terminates in a hollow collar 18 extending rearwardly, coaxially with the optical axis 19 of the reflector surface 17.

The lamp 11 is mounted along the optical axis 19, with the stem 13 extending into the hollow collar 18, and with the light producing region of the lamp bulb 14 coinciding with the near focus point $f1$ of the reflector surface 17. The end portion of the stem 13 is attached to the end region of the collar 18 by means of a refractory cement 20. An insulated connector wire 21 is shaped as shown, and an end thereof is connected to a lamp electrode at the end of the stem 12, this connection being surrounded by refractory cement 22 and covered by a ceramic cap 23. The remaining end of the wire 21 extends through a slot in the hollow collar 18, and is connected to a flexible wire 24 for connection to a power source. Another flexible wire 26 for connection to a power source, is connected to an electrode 27 extending rearwardly from the stem 13. A ceramic end cap 28 is positioned over the rear end of the reflector, as shown, and cemented in place by means of the cement 20.

The lamp and reflector assembly thus far described is similar to that disclosed in the above-referenced Slomski patent application.

The light produced in the bulb 14 of the lamp 11, at the focal point $f1$ of the reflector surface 17, is focused by all parts of the ellipsoidal reflector 17 to a far focal point $f2$. When the lamp assembly is used in a projector, it is normal practice to provide a film aperture mask plate 31 positioned transversely to the optical axis 19 in a plane slightly toward the reflector 16 from the far focal point f2, the masking plate 31 being provided with a rectangular aperture 32 centered on the optical axis 19. Means are provided for positioning a film at the aperture 32 on the far side of the masking plate 31, which, in case of a motion picture projector, will be a motion picture film 33 arranged to be moved in a direction such as indicated by the arrow 34. A projection lens arrangement 36 is positioned to focus an image of the film 33 onto a projection screen (not shown).

As has been described above, the frontmost region 37 of the reflector coating 17 is optically distorted, due to the frontmost region of the glass reflector support body becoming unavoidably optically distorted during cooling after being molded.

In accordance with the invention, a tubular heat shield 41 is positioned partially within the front open face of the reflector 16, so as to prevent light (and heat) from the lamp 11 from reaching at least a portion of the distorted region 37 of the reflector surface 17. The heat shield 41 also intercepts reflected light (and heat) from the distorted region 37 of the reflector coating 17, with a net result that the outermost boundary 42 of the circular cross-section convergent projected light beam is reflected from an optically undistorted circumference of the reflective coating 17 adjacent to the optically distorted forward peripheral region 37. Thus, all of the light projected by the lamp assembly, lying within the projected beam boundary 42, is reflected from the optically undistorted reflective surface area of the reflective coating 17. The film masking plate 31 is positioned so that the circular cross-section light beam 42 fills the rectangular aperture 32 across the diagonals thereof, whereupon a slight amount of light, and accompanying heat, falls upon the masking plate 31 adjacent to the sides of the aperture 32. Without the tubular heat shield 41, light and heat reflected from the optically distorted region 37 would impinge upon a considerable area of the masking plate 31 around the aperture 32. Such heat falling upon the masking plate 31 would undesirably heat the plate 31, causing undesirable heating of the film 33 and of adjacent parts in the projector.

The term "heat shield" as used herein connotes a shield for visible light as well as for infrared light (heat) rays, since a certain amount of heat accompanies visible light, and visible light generates heat when it strikes an object.

The tubular heat shield 41 is positioned along the optical axis 19, and preferably extends frontwardly from the front surface of the reflector 16, as well as extending partially within the concavity of the reflector. The inner surface of the heat shield 41 preferably is black or a dark color, to absorb light and prevent reflection thereof. Black anodized aluminum is suitable for the heat shield 41. The heat shield 41 may be attached to the reflector 16 by means of right-angle metal tabs 46 which attach the heat shield 41 to an apertured mounting plate 47 having an aperture approximately the same diameter as that of the front opening of the reflector 16, and attached to the reflector 16 by means of metal clips 48 shaped to fit over the edges of the mounting plate 47 and snugly behind an outwardly extending flange 49 of the reflector 16.

The high intensity lamp 11 produces a small-source of high-intensity concentrated light, which is ideal for use in an ellipsoidal reflector arrangement as shown. The lamp 11 also produces a considerable amount of heat, and, although a large part of the heat is transmitted through the dichroic reflector coating 17 to the sides and rear of the reflector, a considerable amount of heat accompanies the light that is projected frontwardly of the lamp and reflector. The tubular heat shield 41, in accordance with the invention, provides an improved means of dissipating the heat which impinges upon it, as the heat shield 41 may be elongated a desired amount in a direction frontwardly of the reflector 16, as shown, so as to dissipate the heat absorbed therefrom, from the impinging light rays, into the space in front of the reflector 16. Heat-dissipating fins could be attached to the forward outer part of the heat shield 41, if desired, to further facilitate dissipation of heat into the surrounding space. It is preferred that the inner or rearmost end of the tubular heat shield 41 be spaced slightly away from the reflector surface 17, as indicated by the numeral 51, so as to permit air circulation between the heat shield 41 and reflector surface coating 17, in order to further carry away the heat, and to avoid transfer of heat from the heat shield 41 to the reflective coating 17 as would occur if they were in direct contact with each other.

The heat shield 41, being located partially within the concave reflector 16, intercepts light and heat at its largest cross-sectional area, which is the region of lowest energy density of the heat, whereby the heat shield 41 more readily intercepts and dissipates the heat, since there is a relatively low density of heat per unit area on the heat shield 41, than is the case in conventional construction where the relatively more concentrated heat region of the light beam is allowed to impinge on the masking plate 31 around the aperture 32, which inherently heats a smaller area of the masking plate 31 to a relatively higher temperature as compared with the heat shield arrangement in accordance with the invention. The tubular heat shield 41 of the invention has further advantages, in that it dissipates the intercepted heat more readily than does the previously proposed arrangement of providing a flat masking plate directly across the front of the reflector 16, this greater heat dissipation of the tubular heat shield 41 being due to the fact that it can be extended into the space forwardly of the reflector 16. Also, the tubular heat shield 41 is found to have an additional advantage of helping to prevent one's fingers from reaching into the reflector 16 which might result in electrical shock, heat burn, and greasy finger spots on the reflector coating 17. The heat shield also advantageously provides a narrower light beam 42 passing through the aperture 32 and film 33 and hence impinging on the lens system 36, thus reducing the amount of heat projected onto the lens system.

In accordance with a further feature of the invention, an air hose cooling jet 56 is positioned in a slot 57 provided in the front end of the tubular heat shield 41, and held in place by means of a tight fit, or cementing or clamping, so as to direct an incoming supply of air 58 in the form of a tubulant cooling air jet 59 toward the hot bulb portion 14 of the lamp 11. It will be noted, from FIG. 1, that the end of the air jet nozzle 56 can readily be located so as to be outside of the boundary 42 of the light beam projected by the reflector-lamp assembly.

The tubular heat shield 41 may be tapered, if desired, as shown in FIGS. 3 and 4. In FIG. 3, the heat shield 41 is tapered conically toward a smaller diameter frontwardly of the reflector 16, and in the embodiment of FIG. 4 the tubular heat shield 41 is tapered conically so as to have its larger diameter forward of the reflector 16. The embodiment of FIG. 3 tends to have the advantages of providing better interception of light rays reaching the heat shield directly from the lamp 11, and also of better preventing one's fingers from reaching into the interior of the concave reflector (and thus potentially depositing greasy finger spots on the reflective coating 17, and also encountering electrical shock and heat burn hazards), whereas the embodiment of FIG. 4 tends to dissipate the intercepted heat more readily into the space forwardly of the reflector 16. In the embodiments shown, the tubular heat shield 41 is of circular cross-section, if the reflector 16 has a circular cross-section. However, the tubular heat shield 41 need not necessarily have a circular cross-sectional shape, and, if used with the reflector disclosed in the above-referenced Taillon patent, it would be shaped to have a pair of opposed mutually parallel flat sides, for suitably fitting into the reflector of Taillon.

While preferred embodiments of the invention have been shown and described, other embodiments and modifications thereof will become apparent to persons skilled in the art, and will fall within the scope of invention as defined in the following claims.

What I claim as new and desire to secure by Letters Patent of the United States is:

1. A projection lamp assembly comprising a concave reflector member of elliptical configuration having an open face and having a first focus point within the reflector and a second focus point in front of said open face, a projection lamp positioned within said concave reflector member at said first focus point, said reflector member being optically distorted at a circumferential region adjacent to said open face, and a tubular heat shield positioned partially within said reflector member at the open face thereof and circumferentially adjacent to and spaced from said reflector member to permit air circulation therearound and into the space in front of said assembly, said heat shield being dimensioned and positioned to intercept and prevent light and heat from being projected from said optically distorted region of the reflector.

2. A projection lamp assembly as claimed in claim 1, in which said tubular heat shield extends frontwardly of said open face of the reflector member.

3. A projection lamp assembly as claimed in claim 1, in which said tubular heat shield is in the form of a hollow cylinder.

4. A projection lamp assembly as claimed in claim 1, in which said tubular heat shield is in the form of a hollow conical section with the smaller diameter thereof facing frontwardly of the reflector member.

5. A projection lamp assembly as claimed in claim 1, in which said tubular heat shield is in the form of a hollow conical section with the larger diameter thereof facing frontwardly of the reflector member.

6. A projection lamp assembly as claimed in claim 1, including an air nozzle attached to said tubular heat shield and positioned to direct a stream of air toward said projection lamp.

7. A projection lamp assembly as claimed in claim 1, including a mounting plate positioned over said open face of the reflector member and provided with an opening therethrough substantially coinciding with the open face of the reflector member, and means attaching said tubular heat shield to said mounting plate.

8. A projection lamp assembly as claimed in claim 7, in which tubular heat shield extends through said opening in the mounting plate with a portion of the heat shield extending rearwardly of the mounting plate and into the concave reflector member and another portion of the heat shield extending frontwardly of the mounting plate, said opening in the mounting plate being larger than the tubular heat shield thereby reducing direct contact thermal coupling between the heat shield and the mounting plate.

9. A projection lamp assembly as claimed in claim 1, in combination with an apertured film masking plate positioned in front of said projection lamp assembly and parallel to said open face of the reflector member, said projection lamp assembly projecting a convergent light beam toward said second focus point, the cross-sectional area of said convergent light beam being limited by said tubular heat shield, said masking plate being positioned between said second focus point and said projection lamp assembly with the film aperture thereof substantially centered on the axis of said convergent light beam, said film masking plate and said projector lamp assembly being positioned a distance apart such that said convergent light beam substantially fills said aperture and said heat shield prevents light and heat from being reflected from said optically distorted region onto said masking plate around the aperture thereof.

10. A projection lamp assembly as claimed in claim 9 in which said tubular heat shield extends frontwardly of said open face of the reflector member, and including an air nozzle attached to said tubular heat shield and positioned to direct a stream of air toward said projection lamp.

* * * * *